INVENTOR.
OTTO KORNEI
BY Harry C. Page
ATTORNEY

INVENTOR.
OTTO KORNEI
BY Harry C. Page
ATTORNEY

Patented June 23, 1953 2,643,130

UNITED STATES PATENT OFFICE 2,643,130

MULTILAYER MAGNETIC RECORD MEMBER

Otto Kornei, Cleveland Heights, Ohio, assignor to The Brush Development Company, Cleveland, Ohio, a corporation of Ohio Application November 2, 1949, Serial No. 125,097

4 Claims. (Cl. 274—41.4)

Figure 1:
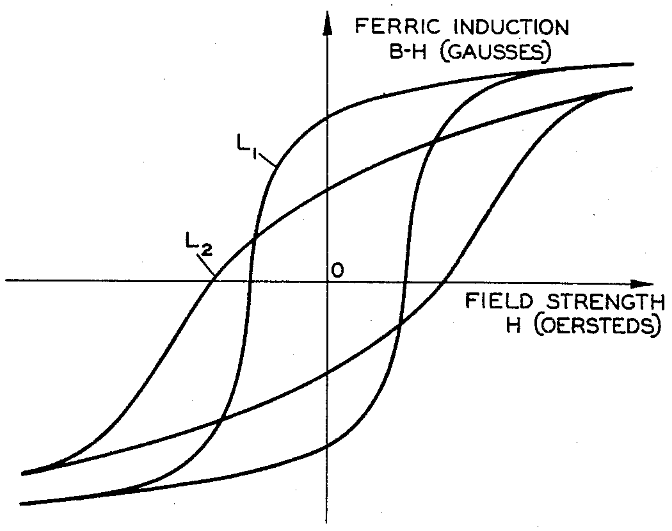

This invention pertains to a magnetizable record member for magnetic recording and reproducing equipment, and more particularly to a magnetizable record member comprising a dispersion of finely divided magnetizable particles carried on a base member.

Such coated record members are becoming increasingly important in the field of magnetic recording and it is common practice to operate them in conjunction with ring-type magnetic heads or transducers. These are magnetic erasing, recording and reproducing heads with an essentially closed magnetic path. Such heads engage the recording medium on one side only and are usually in physical contact with the magnetizable layer immediately adjacent the operating gap of the head.

There are, primarily, three features which are desired in such a recording system. First, the reproduced signals should be strong enough to override, by an ample margin throughout the whole frequency band, such disturbances as noise from the record member, amplifier noise, hum pickup and the like. Specifically it is necessary to provide a usable signal-to-noise ratio for each frequency component in the band of signals to be reproduced.

Second, the variation of the signal strength, throughout the whole frequency band, should be as small as possible. In most cases it is necessary to provide electrical circuits which are effective further to reduce this variation of signal strength over the whole frequency band. These are known as equalizing circuits and it is desirable that the record medium have a response which is effective to reduce to a minimum the need for such electrical equalizing.

Third, the distortion of the reproduced signal should be as low as possible throughout the whole frequency band.

The first of these conditions is primarily determined, at least in the range of long wave lengths, by the total remanent flux available in the magnetizable layer, i. e., by the product of its retentivity and cross-sectional area. Since the width of the record track is usually of a given and constant value, it may also be stated that the maximum reproduced signal strength is proportional, in the long-wave range, to the product of the retentivity of the magnetizable layer and its thickness. This rule does not apply to the short-wave or upper frequency range. Applicant has found, and this was later confirmed by other investigators, that the signal energy of the upper frequency range appears to be concentrated substantially in a rather thin surface layer (in the order of a few ten thousandths of an inch in thickness) of the recording material. Any increase in thickness of this relatively thin surface layer does not contribute materially to the signal strength of the upper frequency range. This effect has been called either "penetration" effect or "surface" effect.

The variation of the reproduced signal strength with frequency, commonly called the frequency response, depends primarily upon the speed of the recording medium, the gap length of the magnetic transducer head and upon the magnetic properties of the magnetic layer. In this latter respect, it has been found that, in general, materials with a more slanting slope of the hysteresis loop yield a better high-frequency response than those having a relatively steep slope.

In order to achieve a minimum of distortion in a magnetic recording system, it is the common practice to superimpose an additional magnetic field, which is generally called the "bias field," upon the signal field during the recording process. The bias field may be provided either by an alternating current or by a direct current. In any event, the distortion provided by a particular portion of the record depends, to a large extent, upon the bias field to which that portion of the record was subjected during the recording process. In a ring-type head, such as is commonly used in magnetic recording devices, the strength of the bias and signal fields decreases rapidly with increasing distance from the air gap. Thus the layers of the magnetic material of the record which are close to the air gap are necessarily subjected to much higher bias and signal fields than are the layers of the magnetic record which are more remote from the air gap.

From a consideration of the factors and characteristics outlined above, it is apparent that different layers in a record member used with a ring head are necessarily subjected to different conditions in the recording process and necessarily therefore contribute differently to the over-all response in a reproduced signal having a rather wide range of frequencies.

It is an object of the present invention to provide an improved record member for use with a ring-type head in magnetic recording and reproducing devices.

It is another object of the invention to provide a record member which has an improved frequency response and a relatively high output level through its entire frequency range.

It is an additional object of the invention to provide a record member which provides a minimum of distortion in the reproduced signal.

It is an additional object of the invention to provide a record member which has an improved erasing characteristic.

In accordance with the invention, a record member for use with a ring-type head in magnetic recording devices includes a plurality of layers of magnetic material having different magnetic properties for the purpose of providing a better over-all response from the system. This record member comprises a first layer of magnetic particles in a binder, and a second layer of magnetic particles in a binder on the first layer and spaced from the first layer so that a bias field produced from the head is effective to provide a substantially maximum output from the first layer and is also effective to provide substantially maximum output from the second layer. It may be preferable to provide, in addition to the first layer, a plurality of other layers each of which is spaced from the first layer in the manner specified above. Also, in a preferred embodiment of the invention, the layers specified above may be carried by a base member of a non-magnetic material.

For a better understanding of the present invention reference is made to the following description taken in connection with the accompanying drawings and its scope will be pointed out in the appended claims.

Figure 2:
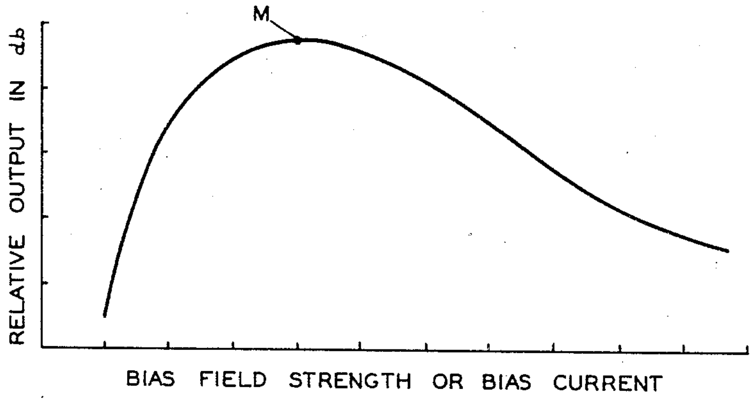
Figure 4:
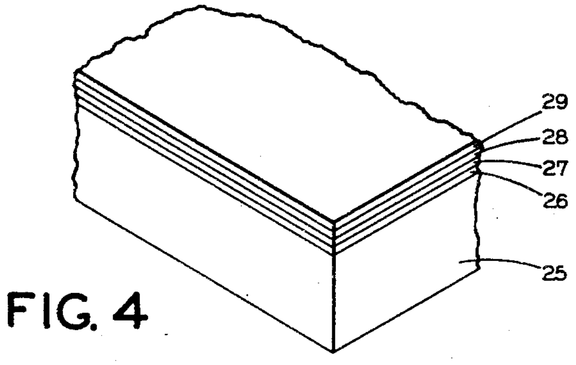
Figure 3:
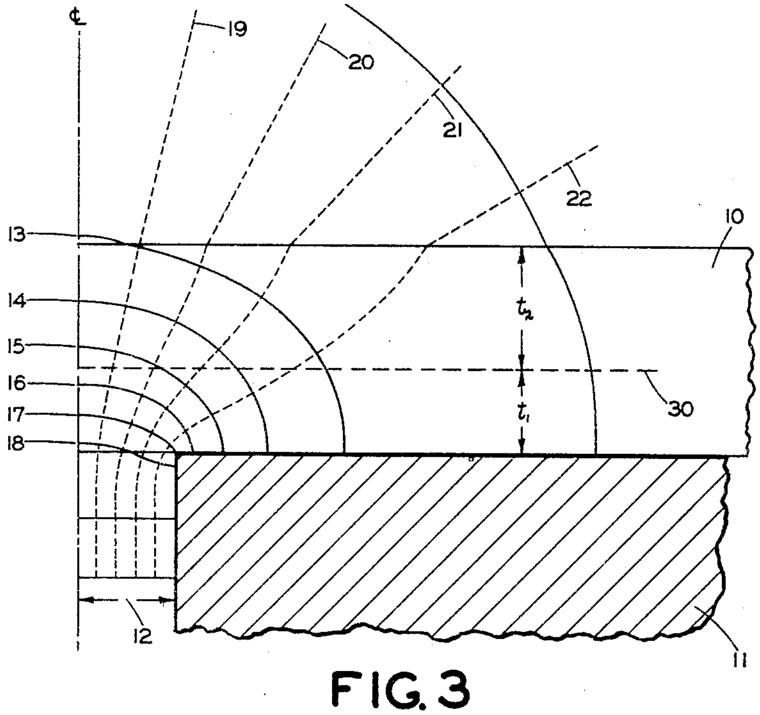

Fig. 1 of the drawing represents hysteresis loops used in explaining certain principles of the invention; Fig. 2 is a curve which is used to illustrate the manner of obtaining a proper bias; Fig. 3 comprises a field plot used in explaining the invention; Fig. 4 illustrates a record member constructed in accordance with the present invention, and Fig. 5 comprises curves useful in explaining a specific modification of the invention.

It has been stated above that, in general, materials with a more slanting slope of the hysteresis loop yield a better high-frequency response than those having a relatively steep slope. Loops of the type under consideration are illustrated by way of example in Fig. 1 where $L_2$ denotes a loop which is more slanting than the loop $L_1$. In this representation of the magnetic properties of a ferromagnetic material, it is well-known that the distance between the origin 0 of the axes and the intercept of the loop with the ordinate defines the retentivity while the distance from 0 to the intercept of the loop with the abscissa, defines the coercivity of the material, provided the magnetization was carried to saturation. It is clear, from the figure, that the ratio of these two quantities determines, essentially, the steepness of the slope of the hysteresis loop.

The previous statement may, therefore, also be expressed by saying that the frequency response of a magnetic recording medium improves with increasing ratio of its coercivity to its retentivity. It so happens that the retentivity of most magnetic materials used in providing power-coated record members does not vary widely. It is generally true that their retentivity varies a good deal less than their coercivity. It can therefore be stated to a rough, but frequently sufficient approximation, that the frequency response improves with increasing coercivity.

In order to achieve a minimum of distortion, certain additional measures must be taken in the recording process. It is well-known for this purpose, to superimpose an additional magnetic field, the so-called bias field, upon the signal field which influences the recording material during the recording process. This bias field may be generated either by direct current or by alternating current superimposed upon the signal current. In the latter case, the frequency of the alternating current is usually chosen well beyond the highest signal frequency to be recorded. In either case, susbtantial freedom of distortion may be achieved if the magnitude of the bias field strength is properly selected. High-frequency bias is used in most of today's magnetic recording equipment because it offers various advantages, primarily a greater signal-to-noise ratio of the reproduced signal.

The selection of the bias field strength is of great importance for the satisfactory performance of the magnetic recording material. The optimum magnitude of the bias field strength depends, primarily, upon the magnetic properties of the recording material. Higher coercivity requires, in general, a higher bias field strength, but there are also other factors, such as the shape of the remanence versus field-strength curve, the thickness of the magnetic layer, etc., which have an important influence upon the optimum bias. Experience has shown that there is no satisfactory method of predicting the correct bias for a recording material from its known magnetic properties; that the only reliable way is the experimental approach. This is usually done in the following manner: A low frequency (long wave length) signal is recorded with constant signal current but with different values of the superimposed bias field strength (bias current). The reproduced signal strength is then plotted versus the bias current; this results in a curve of the general shape shown in Fig. 2. It can be seen that this curve first rises rapidly to a more or less flat maximum at M after which it falls off more slowly. The optimum bias current, yielding a minimum of distortion is, ordinarily, the current at, or very near, the maximum of this "bias curve."

Any value of bias current (or bias field strength) lower than this optimum value results in intolerable distortion of the reproduced signal, particularly in the long wave length range. Any bias greater than the optimum value is, usually, not too detrimental with regard to distortion but causes a loss in the signal strength in the upper frequency range. This loss increases with both increasing signal frequency and bias field strength.

From the preceding explanations it will now be clear why conventional recording materials, particularly those comprising powdered magnetic particles, exhibit certain shortcomings in one respect or the other. Such materials have heretofore been selected with a view to finding the best compromise between the seemingly incompatible requirements of the basic rules which govern the performance of the recording material. For instance, if it is attempted to increase the signal strength by increasing the layer thickness, only the low-frequency level will be improved. Under the assumed conditions, the high-frequency level will remain substantially unchanged, thus producing an increased relative difference between the strength of the reproduced low-frequency signals and the high-frequency signals. On the other hand, if an improvement of the high-frequency level is sought by reducing the bias field strength, increased distortion will result.

Even the seemingly simplest solution to the problem, namely, the selection of a magnetic pigment possesssing both high remanence and high coercive force does not give satisfactory results. For reasons which will be outlined in detail below, it becomes impractical, under such conditions, to provide the correct bias field strength and erase field strength.

The magnetic conditions existing within the magnetic layer of the recording material in the immediate vicinity of the recording gap will now be considered in more detail. Only the magnetic conditions relating to the bias field will be considered though essentially identical considerations apply also for the signal field. The signal field, however, is of no special importance in connection with the present problem.

A direct measurement of the field strength inside the magnetic layer is not feasible because of its extreme thinness. However, analytical and graphical methods yield rather accurate results. Fig. 3, for instance, shows the graphical representation of the calculated field strength inside the magnetic layer of a powder-coated record member under the assumption of a constant permeability of 3, a value which is representative of average practical conditions. The reference number 10 denotes the magnetic layer of a thickness of 0.0005 inch. A portion of one of the two confronting pole edges of a recording ring head, assumed to possess infinite permeability and to have a relatively long contact with the magnetic layer, is represented by the numeral 11. The center line of the recording gap of the head under consideration is represented by the line L. Thus one half of the recording gap length is designated by the reference numeral 12 and the total gap length is assumed to be 0.0005 inch. Inasmuch as the conditions are symmetrical with respect to the center line of the gap, only one half of the field configuration is shown in the figure. Assuming that the pole pieces are energized by a field-generating current, the solid curved lines 13 to 18, inclusive, represent magnetic flux lines, their spacing being inversely proportional to the field intensity. The dashed lines 19 to 22, inclusive, represent magnetic equipotential lines. The region where the recording, or the erasing, is essentially effected is in the region above the gap. It can be seen that the magnetic field intensity in this region decreases with increasing distance of any imaginary layer from the lowest layer which is closest to the gap. With the particular parameters chosen for this example, a change in field strength of over three to one from the layer closest to the gap to the farthest layer is shown by the flux line spacings along the center line of Fig. 3.

Under such conditions it is evident that the previously introduced term of "correct" or optimum bias field strength loses its original meaning if the same magnetic particles are used in the entire space 10. If the bias were so chosen as to give the correct field strength for the imaginary layer near the gap, it will result in too low a bias in the remote layer. Conversely, for correct bias in the remote layer, the near-by layer will be heavily over-biased. The former case will result in substantial distortion of the long wave length range which utilizes the full thickness of the whole magnetic layer; the latter case, though giving essentially distortion free reproduction, will result in an undue loss in the reproduction of the short wave length range. In present-day powder-coated record members, using the same type of magnetic particles throughout the coating, an unsatisfactory compromise must necessarily be chosen to satisfy either condition partially.

In accordance with the present invention, a novel record member is proposed which avoids, or at least substantially reduces, the described shortcomings. Fig. 4 serves to explain more clearly the construction of this medium by showing a cross section through it. A base member 25 is preferably, but not necessarily, flexible and is comprised of paper, plastic or any other suitable non-magnetic material. The base member 25 acts merely as a support and carries superimposed upon it successive layers 26, 27, 28 and 29 of magnetic particles dispersed in a suitable binder. The magnetic particles of each of the layers are of a different type and are so chosen as to provide a better over-all result in the reproduced signal. During operation of the recording apparatus utilizing this novel record member, the layer 29 is in direct contact with, and closely adjacent to, the gap of the head. While four magnetizable layers are illustrated as being superimposed upon the base 25 it will be understood that two layers or any greater number of layers can be used in accordance with the teachings of the present invention. The total thickness of all the layers together should preferably range somewhere between 0.003 inch and 0.001 inch. Layer 29, which is closest to the recording gap when the record member is in use, is given such magnetic properties that it will operate under optimum bias conditions in the relatively strong magnetic field existing in the immediate vicinity of the gap. Layer 28, which is more remote from the gap, is given such magnetic properties that it will also operate under optimum conditions in the relatively weaker field intensity existing farther away from the gap. Similarly, the properties of layers 27 and 26 are selected to provide an optimum result in accordance with their position or distance from the air gap of the recording head.

Inasmuch as any of the superimposed magnetic layers of the record member of the invention is substantially thinner than the total layer thickness of the conventional powder-coated record member, it is evident that the variation of the field strength of either the erasing or the bias field within such a thin layer is relatively small. It, therefore, becomes possible to operate each individual magnetic layer at substantially optimum field strength conditions and to obtain an improved performance from the recording member. In order to achieve ideal operating conditions, a subdivision into an infinite number of individual layers or strata would be required. Theoretical considerations and experiments have shown, however, that two to four layers approximate the ideal conditions to an entirely satisfactory extent.

It was explained before that, in general, a high coercivity of the magnetic layer is required for a good high-frequency response. In practice, however, there have been limitations in this respect. The reason is that it becomes impossible to create the required high erase-field intensity or bias-field intensity in the portions of a magnetic layer of the conventional thickness which are not close to the air gap of the recording head. Overheating or magnetic saturation of the erase and recording heads determines the limits. It is a further advantage of the novel recording medium that these limitations are substantially eliminated. Magnetic powders with very high coercivity can be used to their full advantage in the layer closest to the head and therefore are subjected to the highest field intensity available in the operation of the equipment. This results in a heretofore unobtainable excellence of high-frequency response. At the same time, the layers farther away from the head, which contribute essentially to the medium-frequency range and low-frequency range, will be subjected to the properly reduced field strength as required by their reduced coercivity or otherwise different magnetic properties.

Most of the recording materials now used for powder-coated record members contain ferromagnetic iron oxide as the active ingredient. Both the black oxide, or magnetite, as well as the gamma-modification of the brown oxide (ferric oxide) have been used. Other materials, like pure iron powder of extremely fine particle size, complex oxides of iron and cobalt, various ferrites (for instance, cobalt and copper ferrites) have also been used or proposed for the purposes of magnetic recording. The inherent magnetic properties of all these powders, i. e., the properties as measured on, or extrapolated for, a 100% compacted specimen, depend upon the particular basic method used in their preparation, upon any subsequent mechanical or heat treatment, upon the selection of the particle size, and upon other factors. All these parameters, however, are of no direct concern with regard to the present invention. A more detailed discussion of the magnetic properties, on the other hand, will be helpful for the full understanding of this invention.

Magnetizable powders, which have been commerically used for magnetic recording, range in their magnetic properties within comparatively narrow limits. Their coercivity (coercive force after cyclic saturation) usually lies between 150 and 300 oersteds and their inherent retentivity (remanence after cyclic saturaiton) usually lies between 1500 and 2500 gausses. It is quite feasible, however, to produce powders with a coercivity up to and over 1000 oersteds and with an inherent retentivity considerably higher than stated. It is important to note that powder dispersions as used in magnetic recording materials are never 100% compacted but more or less dilute, primarily, because of the necessary binder. The retentivity of the magnetic coating of the finished recording medium will, consequently, always be less than the inherent retentivity of the magnetizable powder contained in it. This effective retentivity is roughly proportional to the volume concentration of the powder, i. e., the ratio of the powder volume in the coating to the total volume of the coating. There are other factors, for instance, particle shape and orientation which also influence the inherent retentivity but it suffices for the present consideration to assume that the mentioned proportionality is correct.

In practice, the powder volume concentration of present recording materials may range between about 25 and 50 per cent, with a preferred and predominant range from about 30 to 40 per cent and a corresponding effective retentivity from about 300 to 800 gausses. It should be mentioned that the formulas for the composition of the magnetic coating dispersions are, in practice, hardly ever given in volume per cent but in the more convenient, though less significant, weight per cent. If the densities of both the powder and the binder (or their ratio) are known the one can be easily derived from the other by calculation. Most magnetic-powder layers in practical use contain pigments with a density of about 5 and a binder with a density around 1. Thus, the volume percentages corresponding to the most common weight percentages of 65% to 75% can be calculated to range from 27% to 37%.

The described possibility of varying the retentivity of a powder dispersion by varying its powder content presents an important tool for the design of the magnetic properties of recording materials in accordance with this invention. Since the coercivity of a magnetic powder remains independent of its concentration, but not its retentivity, it becomes possible to vary, at will, the important ratio of coercivity-to-retentivity whose significance was explained before. This measure, combined with the proper selection of the thickness of the individual layers and of the inherent magnetic properties of the powders, results in a wide variety of parameters permitting the construction of superior recording materials in accordance with this invention.

An example of the actual design of such a multi-layer recording material shall now be briefly given. After the total layer thickness has been decided upon, a field strength plot similar to that of Fig. 3 is established. Such a plot, to be exact, would appear much more complicated than the one of Fig. 3, because of the existence of two or more superimposed layers of different permeabilities and thicknesses. For design purposes, however, it is generally permissible to use one approximate average value of permeability.

Assuming a two-layer construction of the recording medium, specifically a recording medium in accordance with Fig. 4 in which layers 28 and 29 are omitted, a line 30 may now be drawn in the plot, which line divides the total layer thickness of the magnetic coating 10 into two individual layers of thicknesses $t_1$ and $t_2$, respectively. These thicknesses are so constructed that the field strength variation within each of them is about the same. This means that the deviation from the optimum bias field strength in each of the layers will be the same and, also, substantially less than it would be throughout the total layer thickness as in the case of a conventional one-layer recording medium.

Two magnetic dispersions are now selected in such manner that the ratio of their respective optimum bias field values, determined from experiments on very thin and single layered materials, equals the ratio of the average field strength existing in each of the two layers in the field plot. It is important to note that the magnetic properties of each of these layers may still be selected within a wide range of characteristics so long as the ratio of their optimum bias field strengths equals the predetermined value.

The final selection of the individual magnetic properties will depend upon the special features desired in the recording material. If, for instance, a good high frequency response is sought in combination with a high level in the low-frequency range, one will choose as follows: The top layer 27 which under the conditions assumed determines the short wave length response, is given a high coercivity-to-retentivity ratio, with both of these quantities as high as possible, in order to achieve not only a wide extension of its response into the short wave length range but also a high absolute level in this range. The limitation for these magnetic properties is set only by the highest bias field strength which can be produced, within this layer, by the particular recording head being used. The bottom layer 26, which is predominantly only effective to contribute to the long wave length response, is given the highest possible retentivity while its coercivity is relatively unimportant and usually much lower than that of the top layer 27 for the two-layer tape under consideration. The additional condition to be met by the bottom layer 26 is that its optimum bias must be in the proper relationship to that of the top layer 27, as explained before.

Figure 5:
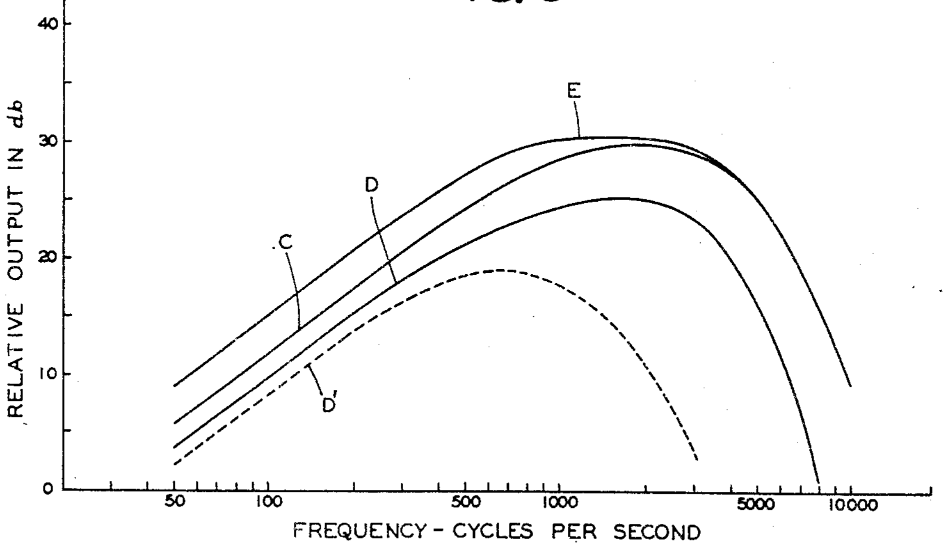

To further illustrate the features of this invention there is shown, in Fig. 5, the output-versus-frequency curves of a two-layer recording material designed in accordance with the teachings of this invention. The data were derived in the customary manner, with constant current in the recording head and are plotted on logarithmic scales for both axes. The curves were obtained from actual measurements of a two-layer tape, moving at 7.5 inches per second, wherein the layer 26 was about 0.0003 inch thick and contained about 80% by weight of black iron-oxide powder dispersed in a vinyl resin binder. The coercivity of this layer was about 110 oersteds and its retentivity about 400 gausses, with a coercivity-to-retentivity ratio of 0.28. Layer 27 was about 0.0002 inch thick and contained about 80% by weight of a black iron-cobalt oxide dispersed in a vinyl resin binder. Its coercivity was about 480 oersteds and its retentivity about 750 gausses, with a coercivity-to-retentivity ratio of 0.64.

Curve D represents the frequency response of layer 26 alone, for optimum bias and as it would appear had the head been in direct physical contact with the layer during both the recording and playback processes. Owing to the spacing effect and the partial magnetic shielding of the layer 26 by the layer 27, however, this curve will effectively be altered and appear as in curve D'. The performance of the layer 27 alone, for optimum bias, is indicated by curve C.

In accordance with the former explanations it can be seen that the layer 26 was so chosen as to its magnetic properties as to contribute primarily in the long wave range, while the layer 27 extends much higher into the short wave range (higher frequencies). The over-all response curve of the compound medium is indicated by curve E. It can be seen that its output in the long-wave length range is essentially controlled by the sum of the outputs of the two layers 26 and 27 and that its output in the short-wave length range is essentially controlled by the layer 27 alone. The intermediate range, which extends in the chosen example roughly from 800 to 3000 C. P. S., is controlled by partial contributions from both layers. Depending upon the shapes and relative output levels of the individual response curves, this intermediate range will be more or less extended and appear to be either roughly flat, as shown, or even slightly saddle-shaped; i. e., with a more or less pronounced depression in its center. It now becomes clear that the composite curve E, by properly selecting the features of the individual curves C, D and D', can be given a much more desirable shape than any single-layer recording material can offer.

It is apparent that the composite response curve shows a much broader hump in the vicinity of the maximum response than any response from conventional single layer materials. In the example selected, there is a frequency range extending approximately from 400 to 5000 C. P. S. (a frequency ratio of over 1:12) within which the response does not vary more than by a total of 5 db; this range can be extended even more by a more judicious selection of the individual layers, for instance, by choosing layer 26 with a higher remanence or by making it thicker. The practical significance of this result lies in the fact that, within any given frequency range, much less electrical equalization is needed with the compound recording medium of the invention. This, in turn, simplifies the design of the electronic equipment and improves the signal-to-noise ratio. Less hum trouble is also encountered due to the increased output in the low frequency range. For certain applications, with less stringent quality requirements, equalizaton may even be dispensed with completely. For so-called "telephone quality," or for dictating machines for instance, the previously mentioned frequency range of 1:12 with a maximum output variation of 5 db is entirely adequate.

A further advantage of the described recording member resides in its substantially reduced distortion over the entire frequency range. This effect is made possible only because each of the two superimposed layers is subjected, throughout its thickness, to optimum or near-optimum bias conditions.

A consideration of the description of the invention will show that applicant has provided a record member which comprises a first layer of magnetic particles in a binder and a second layer of magnetic particles in a binder on the first layer with the relationship between the layers such as to provide a much better over-all response from the system. It will be understood that the first layer mentioned may be the layer 26 of Fig. 4 and that the second layer may be the layer 27 of Fig. 4. The layer 27 is spaced from the layer 26 so that a bias field, produced from the head with which the tape is used, which is effective to provide substantially maximum output from the first layer 26 is also effective to provide substantially maximum output from the second layer 27. It will be clear that the spacing recited has reference to the mean spacing between the layers rather than the actual separation of the two layers. Thus in another embodiment of the invention, with specific reference to the record member illustrated in Fig. 4, the first layer may be considered to be layer 26 and the second layer may be considered to be layer 29. In accordance with the teachings of the invention, it is necessary that the mean spacing of the layer 26 and the layer 29 be such that a bias field produced from the head with which the tape is operated and which bias field is effective to provide a substantially maximum output from the first layer 26 is also effective to provide substantially maximum output from the layer here considered to be the second layer, namely, layer 29.

Also from the above, it will be understood that the invention includes the idea of providing a first layer on a base material, such as layer 27 of Fig. 4 which is not directly in physical contact with the base material, being separated therefrom by the layer 26. Also with layer 27 considered as the first layer mentioned above, the layer 29 may be considered to be the second layer which is more remote from the non-magnetic base material and which has the mean spacing from the first layer and the magnetic characteristics specified.

While there have been described what are at present considered to be the preferred embodiments of the invention, it will be obvious to those skilled in the art that various changes and modifications may be made therein without departing from the invention and it is, therefore, aimed to cover all such modifications and changes as fall within the true spirit and scope of the invention.

What is claimed is:

1. A record member for use with a ring-type head in magnetic recording devices effectively including a plurality of layers of magnetic material having different magnetic properties for the purpose of providing a better over-all response from the system over a given frequency range comprising: an outside layer of magnetic particles in a binder, less than 0.0003 inch thick, having a given coercivity, and adapted to be operated in close proximity with a ring-type head; and another layer of magnetic particles in a binder adapted to be operated further from said head than said outside layer but having at least a portion thereof within a distance of 0.001 inch from said head when in operation and having a coercivity less than half that of said outside layer but having a value of coercivity of at least 110 oersteds; whereby high-frequency signals in said range are accentuated in said outside layer and low-frequency signals in said range are accentuated in said other layer.

2. A record member for use with a ring-type head in magnetic recording devices including two layers of magnetic material having different magnetic properties for the purpose of providing a better over-all response from the system over a given frequency range comprising: an outside layer of magnetic particles in a binder, less than 0.0003 inch thick, having a given coercivity, and adapted to be operated in close proximity with a ring-type head; and a second layer of magnetic particles in a binder contiguous with said outside layer and having a coercivity less than half that of said outside layer but having a value of coercivity of at least 110 oersteds; whereby high-frequency signals in said range are accentuated in said outside layer and low-frequency signals in said frequency range are accentuated in said second layer.

3. A record member for use with a ring-type head in magnetic recording devices including a plurality of layers of magnetic material having different magnetic properties for the purpose of providing a better over-all response from the system over a given frequency range comprising: an outside layer of magnetic particles in a binder, less than 0.0003 inch thick, having a given coercivity, and adapted to be operated in close proximity with a ring-type head; and a second layer of magnetic particles in a binder adapted to be operated further from said head than said outside layer but having at least a portion within a distance of 0.001 inch from said head when in operation and having a coercivity less than half that of said outside layer but having a value of coercivity of at least 110 oersteds and a retentivity of at least 400 gausses; whereby high-frequency signals in said range are accentuated in said outside layer and low-frequency signals in said frequency range are accentuated in said second layer.

4. A record member for use with a ring-type head in magnetic recording devices including a plurality of layers of magnetic material having different magnetic properties for the purpose of providing a better over-all response from the system over a given frequency range comprising: an outside layer of magnetic particles in a binder, less than 0.0003 inch thick, having a given coercivity and a given retentivity, and adapted to be operated in close proximity with a ring-type head; and a second layer of magnetic particles in a binder adapted to be operated further from said head than said outside layer but having at least a portion within a distance of 0.001 inch from said head when in operation and having a coercivity less than half that of said outside layer but having a value of coercivity of at least 110 oersteds and a retentivity greater than that of said outside layer but having a value of at least 400 gausses; whereby high-frequency signals in said range are accentuated in said outside layer and low-frequency signals in said frequency range are accentuated in said second layer.

OTTO KORNEI.

References Cited in the file of this patent

UNITED STATES PATENTS

| Number | Name | Date |
|---|---|---|
| 2,199,526 | McCowen | May 7, 1940 |
| 2,443,756 | Williams | June 22, 1948 |
| 2,496,047 | Goddard | Jan. 31, 1950 |
| 2,501,126 | Howell | Mar. 21, 1950 |

FOREIGN PATENTS

| Number | Country | Date |
|---|---|---|
| 324,099 | Great Britain | Jan. 17, 1930 |